Feb. 27, 1940.   E. F. ROSSMAN ET AL   2,191,942
HYDRAULIC SHOCK ABSORBER
Filed Oct. 28, 1938

INVENTORS
EDWIN F. ROSSMAN AND
ROBERT B. BURTON, HENRY O. FUCHS
BY
*Spencer, Hardman and Fehr*
ATTORNEYS Patented Feb. 27, 1940

2,191,942

UNITED STATES PATENT OFFICE 2,191,942

HYDRAULIC SHOCK ABSORBER

Edwin F. Rossman, Dayton, Ohio, and Henry O. Fuchs and Robert B. Burton, Detroit, Mich., assignors to General Motors Corporation, Detroit, Mich., a corporation of Delaware Application October 28, 1938, Serial No. 237,400

4 Claims. (Cl. 267—8)

This invention relates to improvements in hydraulic shock absorbers particularly adapted to control the approaching and separating movements of the frame and axles of a vehicle.

It is among the objects of the present invention to provide a double acting hydraulic shock absorber of simple and compact structure and which is capable of controlling the relative movements of a vehicle frame and axles to a predetermined degree throughout the entire range of such movements.

Further objects and advantages of the present invention will be apparent from the following description, reference being had to the accompanying drawing wherein a preferred embodiment of one form of the present invention is clearly shown.

Figure 1:
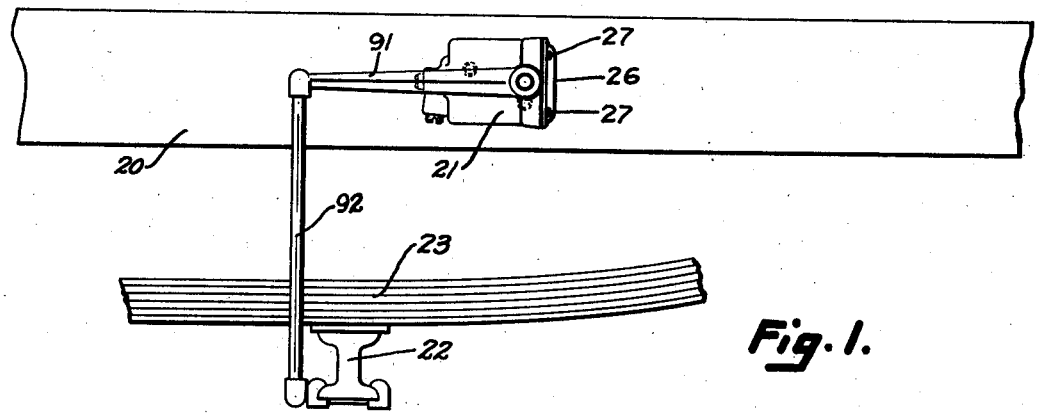
Figure 1 shows a shock absorber embodying the present invention, applied to a vehicle frame and axle, both of which are shown in fragmentary form.

Referring to the drawing, the numeral 20 designates, in fragmentary form, the frame of the vehicle to which the shock absorber is attached. The vehicle axle designated by numeral 22, carries vehicle springs 23, which are hingedly secured to the vehicle frame 20 in the usual manner. These hinged connections are not shown in the present drawing.

The shock absorber 21 comprises a housing 25, the open end of which may be closed by a cap 26 secured to the casing by screws 27. This casing 25 provides two cylinders 30 and 31 in substantially parallel relation, these cylinders being separated by the inner walls 32 and 33 respectively. The ends of the cylinders more adjacent the cover plate 26 of the casing are open, communicating with what may be termed the reservoir portion 34 of the casing. In the casing are provided two recesses 35 and 36, opening to the exterior of the casing, the outer ends of these recesses being interiorly threaded to receive screw caps 37 and 38 respectively. These recesses 35 and 36 may be termed "valve chambers". Valve chamber 35 is in communication with the cylinder 30 by a duct 39. A counterbore 41 in the recess 35 provides an annular ridge forming valve-seat 40. This counterbore 41 is in communication with the cylinder 31 through the passage 42. An extension of the duct 39 beyond the valve chamber 35 communicates with valve chamber 36 and forms the valve-seat 45. An opening in the bottom of the cylinder 31 designated by the numeral 46 provides communication between valve chamber 36 and the cylinder 31. Each valve chamber 35 and 36 has a spring-loaded check-valve, the check-valve of chamber 35 being designated by the numeral 50. The spring which urges the valve 50 upon its seat 40, to close the counterbore portion 41 from the valve chamber 35, is designated by the numeral 51. The valve 52 in the chamber 36 is urged by its spring 53 upon the valve-seat 45, normally to shut off communication between the valve chamber 35 and the valve chamber 36.

Figure 2:
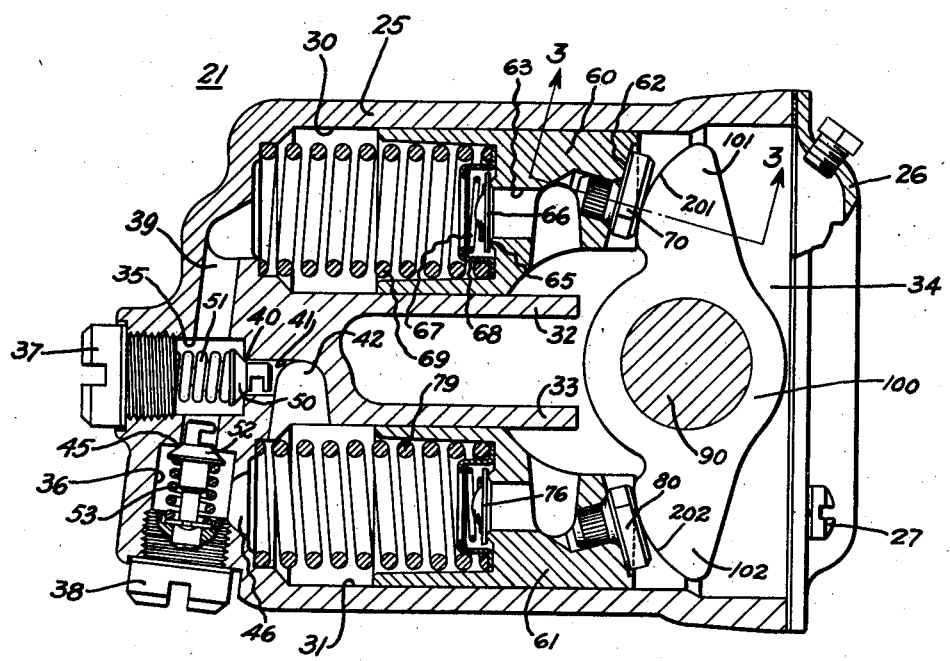
Figure 2 is a longitudinal sectional view taken through the shock absorber, certain parts thereof being shown in elevation for the sake of clearness.

Each cylinder 30 and 31 is provided with a piston, the one in cylinder 30 being designated by the numeral 60, the piston in cylinder 31 by the numeral 61. Both of these pistons are identical and, therefore, only one of them will be described detailedly. Piston 60 has a head portion whose outer surface 62 is sloping, as shown in Figure 2. A passage 63 through the piston head provides communication between the chamber within the cylinder formed by the piston 60 and the reservoir chamber 34 of the casing. About the mouth of this passage 63 more adjacent the interior of the cylinder there is provided an annular valve-seat 65 upon which the disc-valve 66 is yieldably urged by a spring 67, interposed between the disc valve 66 and the cage 68. This cage 68 is maintained in position upon the interior surface of the piston head by a spring 69, interposed between the piston and the bottom end wall of the cylinder 30. Normally, this spring urges the piston 60 toward the open end of the cylinder 30 and into engagement with its actuator. A recess in the sloping surface 62 of the piston 60 receives the shank portion of a wear piece 70 whose outer surface is parallel to and thus slopes similarly to the outer surface 62 of the piston. The valve 76 of the piston 61 is identical with the valve 66 of the piston 60; spring 79 urges piston 61 into engagement with its actuator and piston 61, like piston 60, has a sloping head surface provided with a wear piece 80 similar to wear piece 70 on the piston 60.

A shaft 90 is supported by and journaled in casing 25, one end of said shaft extending to the exterior of the casing and having the shock absorber operating arm 91 secured thereto. This arm 91 is secured to the axle 22 of the vehicle by a link 92 and thus any movement of the axle 22 will be transmitted to the arm 91.

Within the casing 25, shaft 90 carries the actuator cam 100 which, as shown in Figure 2, has two oppositely disposed arm portions 101 and 102. Arm 101 extends into the path of piston 60 and is thus engaged by its wear piece 70 while the other arm 102 of the operating cam 100 extends into the path of the piston 61 and is consequently engaged by its wear piece 80. Each arm is provided with a convex curved surface, the one of the arm 101 being designated by the numeral 201, while the convex curved surface of arm 102 is designated by the numeral 202.

It will be noted that the center of shaft 90 lies in a plane parallel to and passing midway between the axis of the cylinders 30 and 31. From Figure 2 it will be apparent that if the sloping surfaces of the two piston heads were extended so as to intersect such intersection would take place substantially on the plane passing midway between the cylinders and through the center of the shaft 90 and at a point intermediate the center of said shaft 90 and the closed end of the casing 25 including the valve passages.

The convex curved surfaces 201 and 202 of the respective arms 101 and 102 of the actuator cam 100 are so designed that they will effect movement of their respective pistons a predetermined or selected distance for each degree of movement of cam 90 throughout its entire range of travel within the casing. In the present drawing these convex curves are shown to be of such a character that the respective pistons will be moved substantially an equal distance for each degree of rotation of the operating cam throughout its entire range of travel within the casing. Thus the pistons will displace an amount of fluid per degree of cam movement as said cam approaches the extreme end of its range of movement, equal to the fluid displaced by the piston per degree of cam movement when said cam is in or adjacent to the vertical or normal position, in which position the cam is shown in Figure 2 of the drawing. With an ordinary link connection between the cam and pistons or a flat surface contact therebetween it may readily be seen that the pistons would be moved a greater distance per degree of travel of the cam adjacent its vertical position than per degree of travel of the cam near its extreme end positions for as the cam approaches a position 90° from that shown in the drawing its effective horizontal movements upon the piston are materially reduced and thus the pistons would displace a greater amount of fluid in one range of cam movement than in another. In fact the fluid displacement would be a variable throughout.

Figure 3:
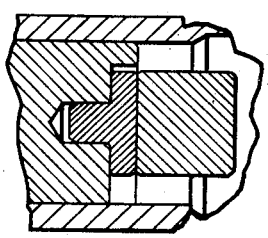
Figure 3 is a detail fragmentary view in section, taken along the line 3—3 of Figure 2.

The cam surfaces 201 and 202, as shown in Figure 3, are comparatively broad and due to their contact under pressure of springs 69 and 79, with the inclined surfaces of wear pieces 70 and 80 on pistons 60 and 61 respectively, any rotation of the pistons 60 and 61 within their cylinders as they are being reciprocated will be opposed for if the pistons 60 and 61 would tend to rotate the aligned flat contact between the cam arm and the wear pieces, as shown in Figure 3, would be destroyed, a higher point of contact tending to be effected which, due to this sloping surface, would be opposed and practically eliminated.

The device acts in the following manner: When a road wheel of the vehicle, not shown in the present drawing, strikes an obstruction in the roadbed over which the vehicle is being operated, the axle 22 is thrust upwardly to approach the frame 20 of the vehicle. Due to connections with the operating arm 91 this arm will consequently be moved in a clockwise direction as regards the drawing and thus the cam 100 will be similarly rotated. Spring 69 will cause piston 60 to follow the clockwise movement of the cam arm 101 and consequently fluid in the reservoir will move the valve 66 against the effects of its spring 67 permitting the necessary substantially unrestricted fluid flow from the reservoir 34, through piston passage 63 into the displacement chamber of cylinder 30. This discharge of fluid under pressure from the displacement chamber 31 into displacement chamber 30 will exert pressure upon the inner surfaces of the piston 60 and thus will assist the spring 69 in maintaining the wearpiece 70 of this piston in engagement with the cam arm 101. Likewise fluid pressure from displacement chamber 30 into 31 will assist spring 79 in maintaining the wearpiece 80 of piston 61 in engagement with the cam arm 102.

This clockwise movement of cam 100 will cause its arm 102 to exert a pushing force upon the piston 61, therefore exerting a pressure upon the incompressible fluid within the displacement chamber of cylinder 31 beneath said piston 61. Pressure upon this fluid in chamber 31 will be transmitted upon the valve 50 to move it against the effect of spring 51 from the seat 40 thereby to establish a fluid flow past valve 50 into the valve chamber 35 and thence through the passage or duct 39 into the cylinder 30. Valve 50 will offer a restriction to the fluid flow from chamber 31 to chamber 30 and this consequent restriction to fluid flow will result in the shock absorber offering a resistance to the approaching movement of the axle 22 toward the frame 20.

The above described movement of the axle 22 will compress the vehicle spring 23, which, after cessation of the upward thrust will rebound toward its normal load position resulting in a separating movement between the frame 20 and the axle 22 of the vehicle. Now a reverse movement of the shock absorber obtains and consequently the cam 100 will be rotated counterclockwise causing the piston 60 to be pushed into its cylinder against the effect of spring 69 and the piston 61 to move out of its cylinder following the counterclockwise movement of the cam arm 102. Under these conditions an unrestricted fluid flow will be established from the reservoir 34 through the passage of the piston 61 and past its valve 76 and into the fluid displacement chamber of cylinder 31 beneath the piston 61. The pressure exerted upon the fluid in chamber 30 by the inward movement of piston 60 will cause valve 52 to be moved from its seat 45 to permit a restricted fluid flow from displacement chamber 30 to displacement chamber 31. As before, this restriction to the fluid flow will result in the shock absorber offering resistance to the separating movement of the frame and axle of the vehicle.

The present shock absorber has an end-to-end discharge, that is, one displacement chamber discharges its fluid under pressure directly into the opposite displacement chamber, and therefore it will be readily seen that the movement of the two pistons must be equal as well as their displacement for, if one chamber would discharge fluid faster than another, an unbalanced condition would obtain, necessitating fluid to be forced out through leakage paths around the pistons. However, if both pistons displace fluid equally, then no such unbalanced condition will be occasioned. From this it may readily be seen that the contour of the convexed curved surfaces 201 and 202 must be identical so that each will move its respective piston at the proper equal rate, any variation in one being present in the other.

As has been mentioned heretofore the particular design of convex curves 201 and 202 of cam arms 101 and 102 controls the effective movements of the pistons 60 and 61 respectively. In the present instance these convex curves are so designed that each piston will be moved a like distance per degree of cam movement at either the neutral or central position of the cam or as the cam approaches its extreme end positions. It may also be understood that these convex curves may be so designed that a greater or lesser movement per degree of cam travel may be transmitted to the piston at either the extreme end positions thereof or at the normal central position. The broad flat contact of the operating cam arms with the sloping wear pieces of the respective pistons prevents piston rotation which is necessary in the present instance where both pistons are cut away on one side to permit a closer approach to the operating cam. This particular arrangement of the shock absorber casing and its parts, particularly the substantially parallel relationship of the two cylinders, the partial nesting of the pistons with the cam at certain positions and the design of the peculiar shaped cam permit a compact structure which is greatly desirable, particularly when shock absorbers are to be used in the present day vehicle where numerous other parts upon the frame of the vehicle reduce available space.

While the embodiment of the present invention as herein disclosed constitutes a preferred form, it is to be understood that other forms might be adopted, all coming within the scope of the claims which follow.

What is claimed is as follows:

1. A hydraulic shock absorber comprising in combination, a casing providing two cylinders in substantially parallel relation and in communication with each other through valved ducts; a piston in each cylinder, each piston having a sloping head portion oblique to its axis and means adapted to provide for the transfer of fluid from one side of the piston to the other; a shaft in said casing; a cam carried by the shaft, said cam having identical, oppositely disposed arms each provided with a curved portion engaging the head of a respective piston, the slope of which opposes rotation of the piston in the cylinder as it is moved by the cam; and a spring urging each piston into engagement with its respective cam arm.

2. A hydraulic shock absorber comprising in combination, a casing providing two, substantially parallel cylinders; a piston in each cylinder, the head portion of each piston being oblique relative to the piston axis; a cam rotatably supported within the casing and having oppositely disposed arms each provided with a curved portion engaging a piston head and adapted to actuate the respective pistons a predetermined, substantially equal distance for each degree of cam rotation throughout its range of movement within the casing; and a spring urging each piston against its respective cam arm.

3. A hydraulic shock absorber comprising in combination, a casing providing two cylinders substantially in parallel relation and valved ducts connecting them; a piston in each cylinder, each piston having a head portion oblique to the plane of piston movement and provided with means for transferring fluid from one side of the piston head to the other as the piston moves in one direction; a cam rotatably supported within the casing and having arms each of which is adapted to engage a piston head to actuate said piston, each arm having a particularly designed curved surface engaging the oblique head of the piston whereby rotation of the piston is opposed and the piston is moved an equal distance for each degree of cam rotation throughout its range of movement within the casing; and a spring urging each piston into engagement with the curved surface of its respective cam arm.

4. A hydraulic shock absorber comprising in combination, a casing providing two cylinders in substantially parallel relation; a cam rotatably supported within the casing and having an arm extending over each cylinder opening, each arm presenting a convex surface of predetermined curvature adjacent each cylinder opening; a piston in each cylinder, having a head portion presenting a surface oblique to the plane of piston movement engaged by the convex surface of the respective cam arm to prevent rotation of the pistons in their cylinders as they are actuated therein; the convex surfaces of the cam arms actuating their respective pistons a predetermined, substantially equal distance for each degree of cam rotation throughout its range of movement within the casing; and a spring urging each piston into engagement with its respective cam arms.

EDWIN F. ROSSMAN.
HENRY O. FUCHS.
ROBERT B. BURTON.